No. 792,912. PATENTED JUNE 20, 1905.
H. G. MORSE, DEC'D.
M. K. MORSE, EXECUTRIX.
PORTABLE TOOL FOR RIVETING OR THE LIKE.
APPLICATION FILED JULY 13, 1903.
4 SHEETS—SHEET 3.
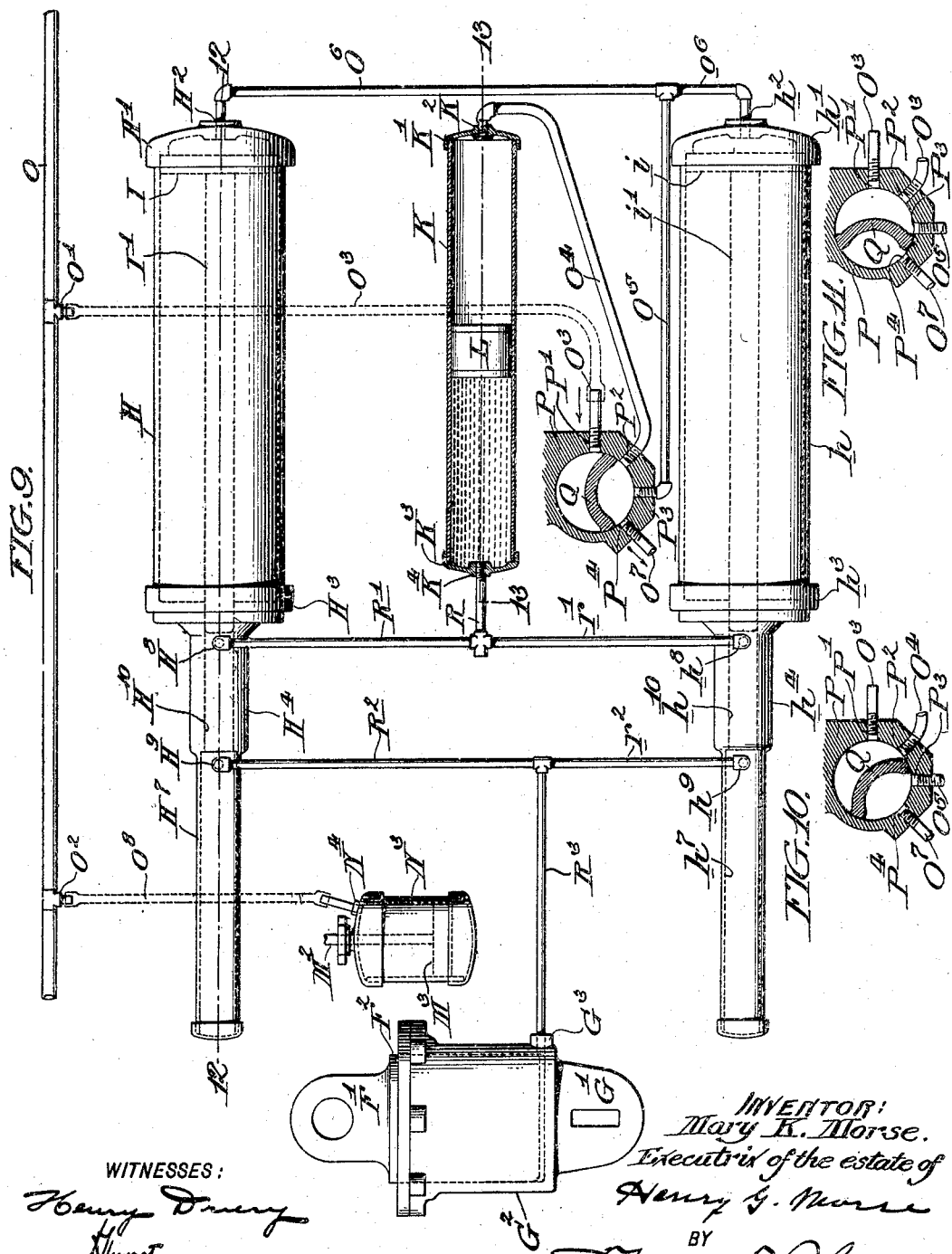
WITNESSES:
INVENTOR:
Mary K. Morse.
Executrix of the estate of
Henry G. Morse
BY
ATTORNEY No. 792,912. PATENTED JUNE 20, 1905.
H. G. MORSE, DEC'D.
M. K. MORSE, EXECUTRIX.
PORTABLE TOOL FOR RIVETING OR THE LIKE.
APPLICATION FILED JULY 13, 1903.
4 SHEETS—SHEET 4.
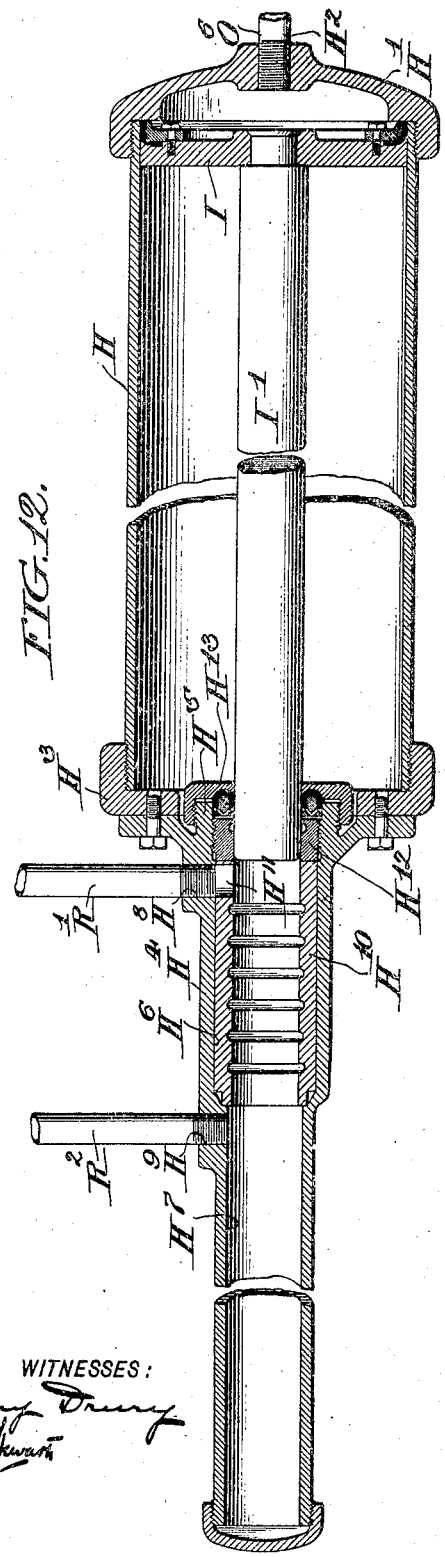
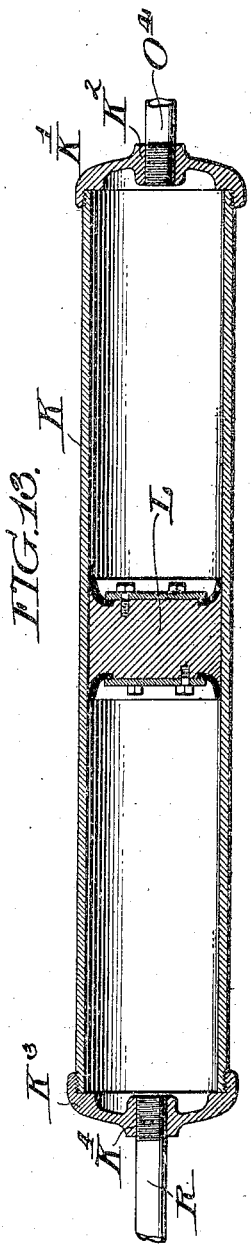
WITNESSES:
INVENTOR:
Mary K. Morse,
Executrix of the estate of
Henry G. Morse
BY
ATTORNEY No. 792,912. Patented June 20, 1905.

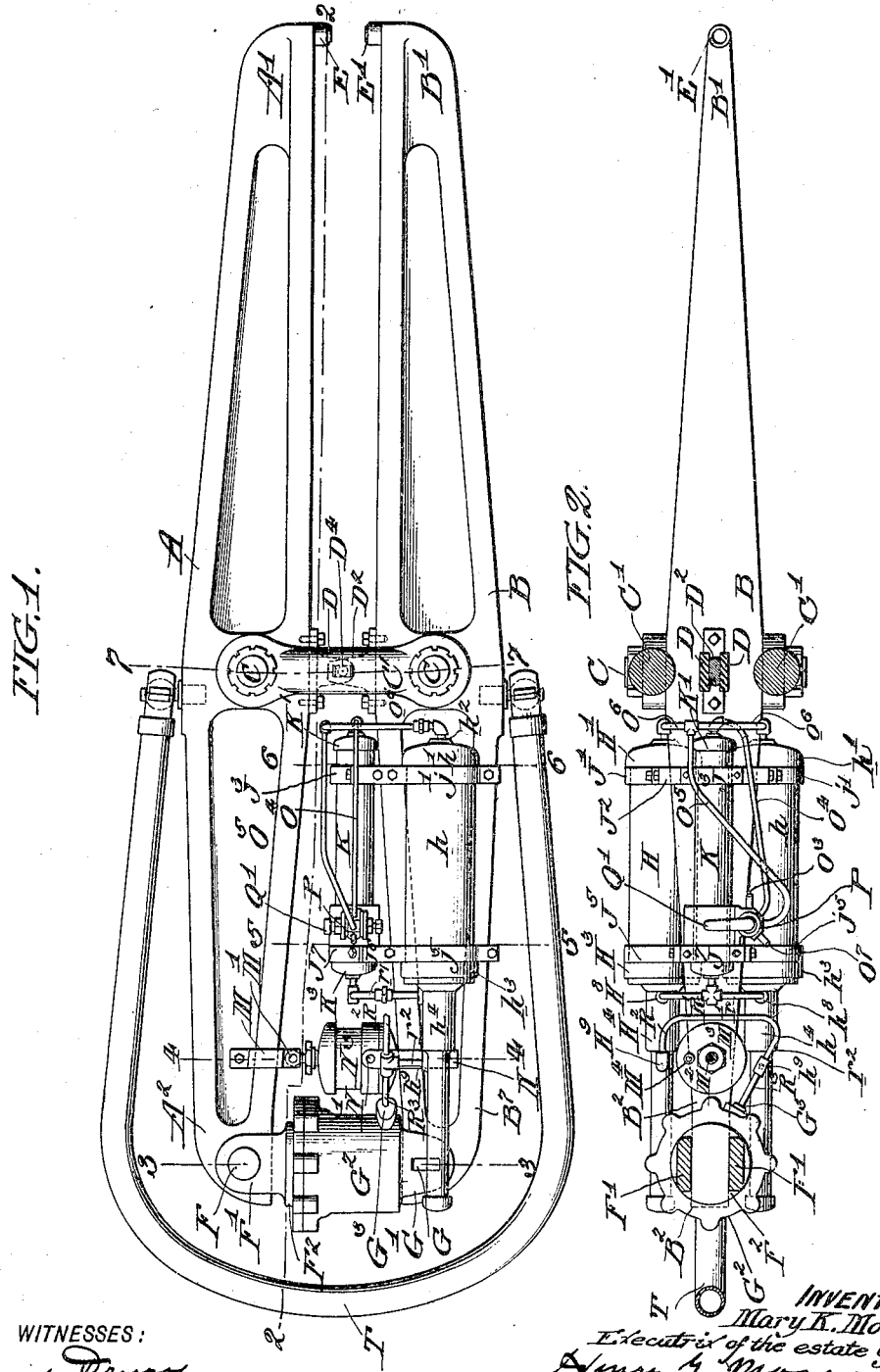

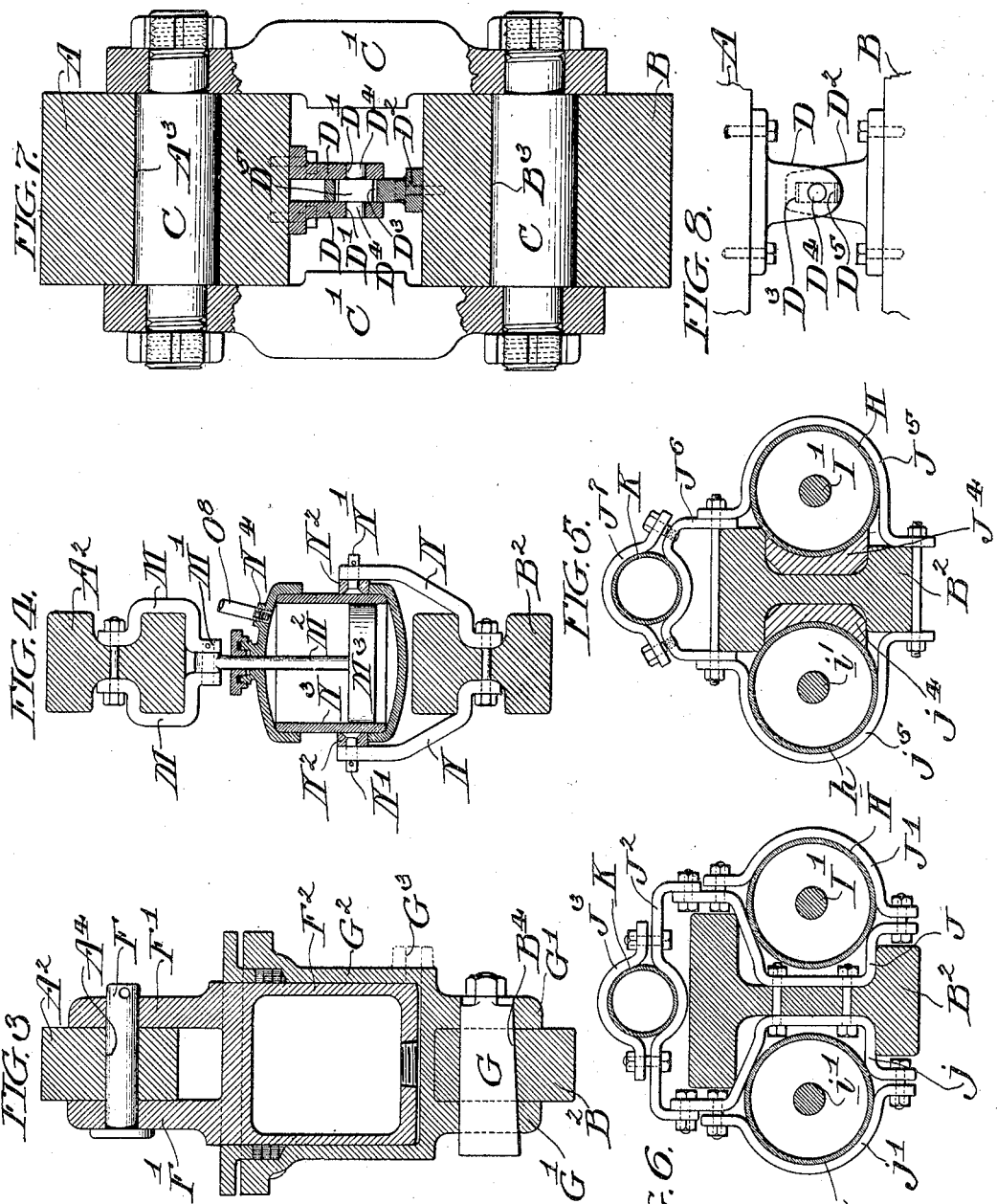

UNITED STATES PATENT OFFICE.

MARY K. MORSE, OF PHILADELPHIA, PENNSYLVANIA, EXECUTRIX OF HENRY G. MORSE, DECEASED, ASSIGNOR TO NEW YORK SHIPBUILDING COMPANY, OF CAMDEN, NEW JERSEY, A CORPORATION OF NEW JERSEY.

PORTABLE TOOL FOR RIVETING OR THE LIKE.

SPECIFICATION forming part of Letters Patent No. 792,912, dated June 20, 1905.

Application filed July 13, 1903. Serial No. 165,273.

*To all whom it may concern:*

Be it known that HENRY G. MORSE, deceased, late a citizen of the United States of America, residing in the city and county of Philadelphia and State of Pennsylvania, did invent certain new and useful Improvements in Portable Tools for Riveting or the Like, of which the following is a true and exact description, reference being had to the accompanying drawings, which form a part thereof.

The invention relates to the construction of a portable tool adapted for use in riveting, punching, and the like, and has for its object to provide a simple, powerful, and accurate portable tool for such purposes.

The nature of the improvements will be best understood as described in connection with the drawings, in which the invention is illustrated in what is believed to be its best mode of construction, and in which—

Figure 1 is a side elevation of the tool; Fig. 2, a sectional elevation taken on the section-line 2 2 of Fig. 1; Fig. 3, a cross-section on the line 3 3 of Fig. 1; Fig. 4, a cross-section on the line 4 4 of Fig. 1; Fig. 5, a cross-section on the line 5 5 of Fig. 1; Fig. 6, a cross-section on the line 6 6 of Fig. 1; Fig. 7, a cross-section on the line 7 7 of Fig. 1; Fig. 8, a side elevation of the cross-head alining device shown in section in Fig. 7. Fig. 9 is a plan view of the actuating-cylinders and controlling devices by means of which the levers of the improved tool are operated. Figs. 10 and 11 are sectional views of the controlling-valve shown in Fig. 9, showing the different positions to which the valve is moved in the operation of the apparatus. Fig. 12 is a longitudinal section through one of the power-cylinders, taken as on the line 12 12 of Fig. 9 and shown on an enlarged scale. Fig. 13 is a longitudinal section through the cylinder K, taken as on the line 13 13 of Fig. 9.

A and B are the levers which constitute, so to speak, both the main operative devices and the frame of the portable machine. A' and B' are the working ends of these levers, to which the appropriate tools, be they riveters, punchers, or the like, are attached, such tools being indicated at E and E', $A^2$ and $B^2$ indicating opposite ends of the levers, to which power is applied to operate the tools.

$A^3$ and $B^3$ are pivotal bearings formed in the intermediate portions of the levers and in which are situated pivot-pins C C, to the ends of which are pivotally connected the links C' C', which connect the two levers together by connecting the pivot or fulcrum pins about which they turn.

In order to secure at all times the proper alinement of the levers and the operative tools supported on their ends, it is evident that some device other than the links C' C' must be employed, and, by preference, the two levers are connected by a sliding cross-head which will effectually prevent any relative shifting which would destroy the proper alinement, and, by preference, this sliding cross-head is placed in the line of action between the pivot-pins C C. In the drawings are represented arms D D as extending inward from the lever A, said arms being provided with pin-bearings, (indicated at D' D',) and another arm $D^2$ is shown extending inward from the lever B and between the levers D D, and in which is formed a cross-head guideway, (indicated at $D^3$,) and these lapping arms are connected by means of a sliding cross-head $D^5$, working in the guideway $D^3$ and having laterally-extending pivot-pins $D^4$ $D^4$ supported in the pin-holes D' of the arms D. It will readily be seen that this connection in no wise interferes with the pivotal movement of the levers, while at the same time it effectually prevents any variance from correct alinement.

In the end $A^2$ of the lever A is formed a pin-hole, (indicated at $A^4$,) in which is placed a pivot-pin F, to the ends of which are pivotally connected the arms F' F', a plunger-piston, (indicated at $F^2$,) and to the end $B^2$ of the lever B is connected, by means of a wedge G passing through a perforation $B^4$ in said lever-arm and through perforations in the arms $G'$ $G'$, a cylinder $G^2$, connected with said arms $G'$, and in which the plunger-piston $F^2$ works, $G^3$ indicating a port for fluid under pressure entering the bottom of the cylinder $G^2$.

H and $h$ are cylinders secured to the lever-arm $B^2$ and of identical construction. Similar parts are marked with the same letters, except that in the one the capitals are used and in the other the small letters. Except, therefore, where it is necessary to speak of both cylinders reference shall be made only to the cylinder marked H.

$H'$ indicates the rear head of the cylinder, having in it a port, (indicated at $H^2$.)

$H^3$ indicates the front head of the cylinder, to which is secured an extension $H^4$ and the stuffing-box, (indicated at $H^5$,) $H^{13}$ indicating the gland by which the packing is tightened. The extension $H^4$ has fitted to its bore (indicated at $H^6$) a grooved cylindrical sleeve $H^{10}$, in which the piston-rod to be hereinafter described fits and which forms, in effect, the extension proper of the cylinder H. In front of this the extension is continued, as indicated at $H^7$, of somewhat larger diameter than the piston-rod.

$H^8$ indicates a port through the extension $H^4$, registering with the port $H^{11}$ in the cylindrical sleeve $H^{10}$, and $H^9$ indicates a port entering the extension $H^7$.

$H^{12}$ indicates a grooved ring screwing into the end of the extension $H^4$ and serving as an abutment for the packing held in place by the gland $H^{13}$.

I is a piston working in the cylinder H and having a piston-rod $I'$, which is also a plunger-piston working through the stuffing-box $H^5$ and fitting in the cylindrical extension $H^{10}$.

As shown, the cylinders H and $h$ are secured to the lever-arm $B^2$ by the devices best shown in Figs. 5 and 6, the front ends of the cylinders bearing against blocks (indicated at $J^4$ $j^4$) and being held thereto by straps, (indicated at $J^5$ $j^5$,) while the rear ends of the cylinders are grasped, as shown in Fig. 6, between straps J $j$ and $J'$ $j'$.

$J^2$ and $J^6$ indicate straps extending over the inner upper face of the lever-arms $B^2$ and serving as supports for the cylinder K, which is clamped thereto by the straps $J^3$ and $J^7$. This cylinder K (best shown in Figs. 9 and 13) has a head $K'$ with a port $K^2$ formed in it and a head $K^3$ with a port $K^4$ formed in it and is provided with a loose piston, (indicated at L,) which is free to move in either direction, M M are arms bolted to the end $A^2$ of the lever A, as well shown in Fig. 4, and supporting on the inside of said lever-arm a pivot-pin $M'$, to which is pivotally attached the piston-rod $M^2$, secured in turn to the piston $M^3$.

N N are arms securely bolted to the lever-arm $B^2$ and supporting, through trunnion-like pins $N'$ $N'$, secured in bearings $N^2$, a cylinder $N^3$, having, as shown, a port $N^4$ at its upper end.

O is a conduit for pressure fluid having outlet-passages at $O'$ and $O^2$, the first connecting with the pipe $O^3$, which in turn connects with the port $P'$ of the casing of a valve, (indicated at P,) said valve-casing having also ports, as indicated at $P^2$ $P^3$ $P^4$, the latter connecting with an exhaust-pipe $O^7$. The port $P^2$ connects, through a pipe $O^4$, with the port $K^2$ at the rear end of the cylinder K, and the port $P^3$ connects, through a pipe $O^5$ and its branches $O^6$ $o^6$, with the ports $H^2$ $h^2$ of the cylinders H $h$.

Q is a valve adjustable in the casing of the valve P, $Q'$ indicating the lever by which the valve is turned.

The port $O^2$ of the conduit O connects, through the pipe indicated at $O^8$, with the port $N^4$ of the cylinder $N^3$.

R is a pipe leading out of the front end of the cylinder K and connecting, through branches $R'$ $r'$, with the ports $H^8$ $h^8$ of the cylinder extensions $H^{10}$ $h^{10}$.

$R^2$ $r^2$ are pipes connecting with the ports $H^9$ $h^9$ and both connecting, through a pipe $R^3$, with the port $G^3$ and the cylinder $G^2$.

T, Figs. 1 and 2, is the bail by means of which the tool as a whole is supported from a convenient means of transporting it to a place of use.

In operation the tool O, suspended from the bail T, is transported to the place of use and the dies or other devices E $E'$ properly adjusted in connection with the work. The valve Q is normally in the position shown in Fig 9, with the pipes $O^4$ and $O^5$ connected with the exhaust $O^7$. In this position the pistons I will be retracted, as shown in Fig. 12, and the piston L will also be retracted to a position depending on the amount of fluid with which the front end of the cylinder K is filled. The pressure fluid from the conduit O being admitted freely to the cylinder $N^3$, the ends $A^2$ $B^2$ of the levers A B will be drawn together as far as they are permitted to go. The operator then turns the valve Q to the position shown in Fig. 10, permitting pressure fluid to pass from the conduit $O^3$ through the conduit $O^4$ and thence into the rear end of the cylinder K, pressing forward the piston L against the oil or other fluid contained in the front end of the cylinder, this oil passing through the conduits $R'$ $r'$ into the extensions $H^{10}$ $h^{10}$ and $H^7$ $h^7$ and through the pipe connections $R^2$ and $r^2$ and $R^3$ to the bottom of the cylinder $G^2$, and the area of the piston is such that the pressure of the piston in the cylinder $G^2$ will overcome that in the cylinder $N^3$, causing the arms $A^2$ and $B^2$ to move apart and the arms $A'$ $B'$ to move together until the tools supported on the lastmentioned arms come in contact with the work. The operator next turns his valve to the position shown in Fig. 11, placing the conduit $O^5$ also in connection with the fluid-pressure supply and connecting the rear ends of the cylinders $H'$ $h'$ with said supply, which then acts upon the piston $I$ $i$, forcing their pistons and plunger extensions $I'$ forward. Said plunger in moving forward first forces a certain quantity of the contained fluid back through the pipes $R'$ and $r'$ to the cylinder K and then closes the port $H^{11}$, its further forward motion pressing the fluid out through the conduits $R^2$ $r^2$, &c., into the cylinder $G^2$, which then acts with the force due to the increased area of the pistons $I$ and $i$, exerting the necessary working pressure upon the tool supported on the lever-arms. The work of punching, riveting, or the like being thus accomplished, the operator again turns the valve Q to the position shown in Fig. 9, putting the rear ends of the cylinders H, $h$, and K in connection with the exhaust, whereby the constantly-acting power of the cylinder $N^3$ will again bring the arms together, the fluid in the cylinder $G^2$ flowing back into the cylinder K.

It will of course be obvious that a single cylinder H will work in exactly the same way as the two cylinders H $h$, the division being for purposes of convenient application and economy of space.

Having now described the invention, what is claimed as new, and desired to be secured by Letters Patent, is—

1. In a portable tool adapted for punching, riveting and the like, the combination of two levers adapted to support operative tools at one end with links, pivotally connecting the levers, arms D D and $D^2$ extending toward each other from the levers, a sliding cross-head supported in a guideway on the arm or arms connected with one lever and pivotally connected with the arm or arms connected with the other lever, and means for operating the levers on the pivotal connections with the links.

2. In a portable tool adapted for punching, riveting and the like, the combination of two levers adapted to support operative tools at one end with links, pivotally connecting the levers, a sliding cross-head connecting the levers in addition to the links, said cross-head connection being situated substantially in the line connecting the link-pivots and means for operating the levers on the pivotal connections with the links.

3. In a portable tool adapted for punching, riveting and the like, the combination of two levers adapted to support operative tools at one end with links, pivotally connecting the levers, arms D D and $D^2$ extending toward each other from the levers, a sliding cross-head supported in a guideway on the arm or arms connected with one lever and pivotally connected with the arm or arms connected with the other lever, said cross-head connection being situated substantially in the line connecting the link-pivots, and means for operating the levers on the pivotal connections with the links.

MARY K. MORSE,
*Executrix of the estate of Henry G. Morse, deceased.*

Witnesses:
JOSEPH F. O'NEILL,
D. STEWART.